United States Patent [19]

Binns

[11] 4,330,057

[45] May 18, 1982

[54] PLATFORM CONVEYORS

[75] Inventor: Keith Binns, Harmandsworth, England

[73] Assignee: Dunlop Limited, London, England

[21] Appl. No.: 813,986

[22] Filed: Jul. 8, 1977

Related U.S. Application Data

[63] Continuation of Ser. No. 667,284, Mar. 16, 1976, abandoned.

[30] Foreign Application Priority Data

Mar. 22, 1975 [GB] United Kingdom ............... 12065/75

[51] Int. Cl.3 ............................................. B65G 23/00

[52] U.S. Cl. .................................................. 198/334

[58] Field of Search ........................ 198/333, 334, 792; 104/25

[56] References Cited

U.S. PATENT DOCUMENTS

| | | | |
|---|---|---|---|
| 3,419,127 | 12/1968 | Yost | 198/333 |
| 3,462,002 | 8/1969 | Zuppinger | 198/334 |
| 3,504,952 | 4/1970 | Farmer | 308/62 |
| 3,608,693 | 9/1971 | Stosberg et al. | 198/866 |
| 3,712,448 | 1/1973 | Burson et al. | 198/334 |
| 3,747,534 | 7/1973 | Zuppinger | 198/334 |
| 3,793,961 | 2/1974 | Salvadorini | 198/334 |
| 3,842,961 | 10/1974 | Barson | 198/334 |
| 3,924,710 | 12/1975 | Shohet | 308/62 |

FOREIGN PATENT DOCUMENTS

| | | | |
|---|---|---|---|
| 2200277 | 8/1972 | Fed. Rep. of Germany | 198/110 |
| 1357031 | 6/1971 | United Kingdom | 198/334 |

*Primary Examiner*—Joseph E. Valenza

*Attorney, Agent, or Firm*—Stevens, Davis, Miller & Mosher

[57] ABSTRACT

Platform for passenger conveyor comprising a rigid flat plate having a wheel set attached to each end. Each wheel set comprising a main support wheel positioned on a guide rail and a retaining wheel positioned on the underside of the rail. The axis of the two wheels being spaced-apart in the direction of movement of the platform.

10 Claims, 5 Drawing Figures

PLATFORM CONVEYORS

This is a continuation of application Ser. No. 667,284 filed Mar. 16, 1976 now abandoned.

This invention relates to platform conveyors and in particular to platform conveyors in which the platforms are supported on rails by wheels.

The invention is particularly useful for variable speed platform conveyors of the type in which the orientation of the platforms with regard to the direction of travel of the conveyor is changed. One such conveyor is described in U.K. Pat. No. 1,251,133 and comprises a series of platforms which are elongated in plan and have parallel longitudinal edges. The platforms are maintained with their adjacent edges in close proximity in the load-carrying zone of the conveyor which comprises a first low speed zone, a first variable speed zone, a high speed zone, a second variable speed zone, a second low speed zone and a return zone beneath the other zones in which the platforms are returned inverted before re-entering the low speed zone. The arrangement of the zones is such that the conveyor can be used in a reversible manner. In the first low speed zone the platforms have their longitudinal sides perpendicular to the direction of movement and are given only a constant speed in a direction perpendicular to their longitudinal axes. In the first variable speed zone the platforms are given in addition a velocity in the direction of the longitudinal edges. This velocity progressively increases and relative sliding between adjacent platforms occurs resulting in firstly the platforms following a curved path and secondly in the platforms accelerating to a higher resultant speed along the path. At the end of the first variable speed zone the speed in the longitudinal direction is held constant and the platforms then lie at an acute angle to their direction of high speed travel. In the second variable speed zone the speed in the direction of the longitudinal edges is progressively reduced to zero and the platforms follow a path curved in the opposite direction until they enter the second low speed zone. The low speed zones conveniently provide loading and unloading zones for a passenger conveying system which has a high overall transit speed due to the high speed zone.

The platforms are supported and guided on rails. Hitherto the platforms have been mounted on two or more carriages each of which runs on a rail. Such carriages, however, create frictional drag which is critical for the power required to drive the conveyor and in order to provide for platform stability have to each be of fairly long wheelbase.

According to the present invention a platform for a platform conveyor comprises a torsionally rigid substantially flat elongated plate having attached to either end a wheel set wherein each wheel set comprises a rigid frame having attached thereto a main support wheel arranged for running on a guide rail and a secondarly retaining wheel arranged for engaging and running upon the opposed side of a guide rail and mounted such that the rotational axes of the two wheels are spaced apart in the direction of movement of the platform. Preferably both wheels are arranged to engage the same guide rail.

In a preferred arrangement the wheel sets are arranged such that the two main wheels are diagonally disposed in plan with regard to the elongated plate and the secondary retaining wheels are disposed at the ends of the other diagonal of the elongated plate. Thus the two wheel sets may be said to be arranged with the secondary retaining wheel leading in one case and trailing in the other case.

Preferably also the wheel sets are attached to the ends of the elongated plate by means of bearing means having an axis of rotation perpendicular to the surface of the plate, so that the wheel sets may pivot about the said axes to allow accurate steering of the guide rails and in the case of a variable speed conveyor as described to allow the required change in orientation of the platforms with regard to the direction of motion.

The wheels may be plain, flanged or preferably have a transversely curved rolling surface for running on tubular rails dependent on the rail system chosen. Furthermore each may comprise a pair of coaxial wheels or alternatively close coupled pairs of wheels dependent on the loads to be carried.

The wheels are preferably mounted on roller or ball-bearing races and may have resilient material rolling surfaces to contact the rails such as nylon or other suitable resilient plastics material.

The position of the retaining wheels may be adjustable relative to the frame to allow them to be brought into closer contact with the guide rails.

The invention also provides a conveyor having platforms of construction as above and includes both constant and variable speed conveyors.

Further aspects of the invention will be made apparent in the following description, by way of example only, of one embodiment of the invention in relation to a variable speed passenger conveyor in conjunction with the attached diagrammatic drawings in which.

Figure 1:
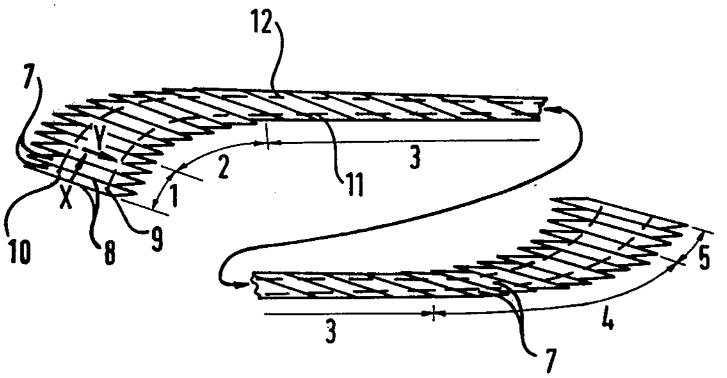
FIG. 1 is a diagrammatic plan view of a platform conveyor according to the invention.
Figure 2:
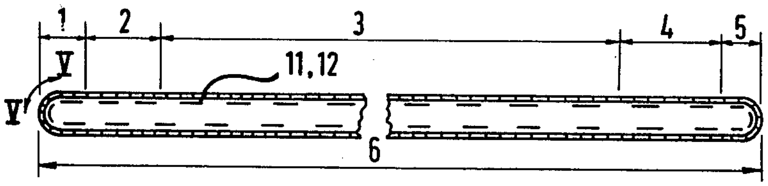
FIG. 2 is a diagrammatic side view of the conveyor shown in FIG. 1.

The conveyor comprises a low speed zone 1, a first variable speed zone 2 in which the conveyor is accelerating, a high speed zone 3, a second variable speed zone 4 in which the conveyor is decelerating, a second low speed zone 5 in which the conveyor is again travelling at a low speed and beneath the conveyor a return zone 6 in which the conveyor elements follow a similar path to the path in the zones 1–5 and also follow similar speed changes. The conveyor comprises a series of platforms 7 in the form of a substantially elongated plate, each platform having its two longitudinal edges 8 mutually parallel and in close proximity, in the order of 2 mms, with the next adjacent platform so as to produce a continuous load bearing surface in the zones 1–5. The platforms are preferably joined by interconnecting means of the kind disclosed in the Assignee's co-pending U.S. patent application No. 667,281 filed on even date, and now abandoned (SB.5561). In the low speed zone the platforms are given a constant speed in the direction X indicated in FIG. 1. As the platforms enter the speed increasing zone 2 a component velocity in the direction Y is also provided. The component velocity Y is progressively increased until, upon leaving the increasing speed zone 2, the platforms are travelling at the required final speed made up of the two components X and Y. Throughout the increasing speed zone the platforms follow a cruved path. When the platforms are moving at the required high speed the velocity Y is held constant and the platforms travel at the resultant velocity of X and Y through the high speed zone 3.

In the second variable speed zone 4 the velocity in the Y direction is progressively decreased to zero and the platforms follow a curved path in the opposite direction to that in zone 2 and finally enter a constant low speed zone 5 where the platforms are once again travelling in the X direction only. The platforms are then recycled underneath the above path as is conventional in constant speed platform conveyors. Throughout the zones 1–5 the platforms are maintained in close proximity to provide the load-bearing surface.

The platforms have their short edges at an acute angle to the abutting sides so that when the platforms are in the high speed zone 3 a substantially straight edge is formed. The platforms are supported at either end by wheel sets 9 and 10 which run on a pair of spaced-apart rails 11 and 12. Each rail 11, 12 comprises a steel tube.

Figure 3:
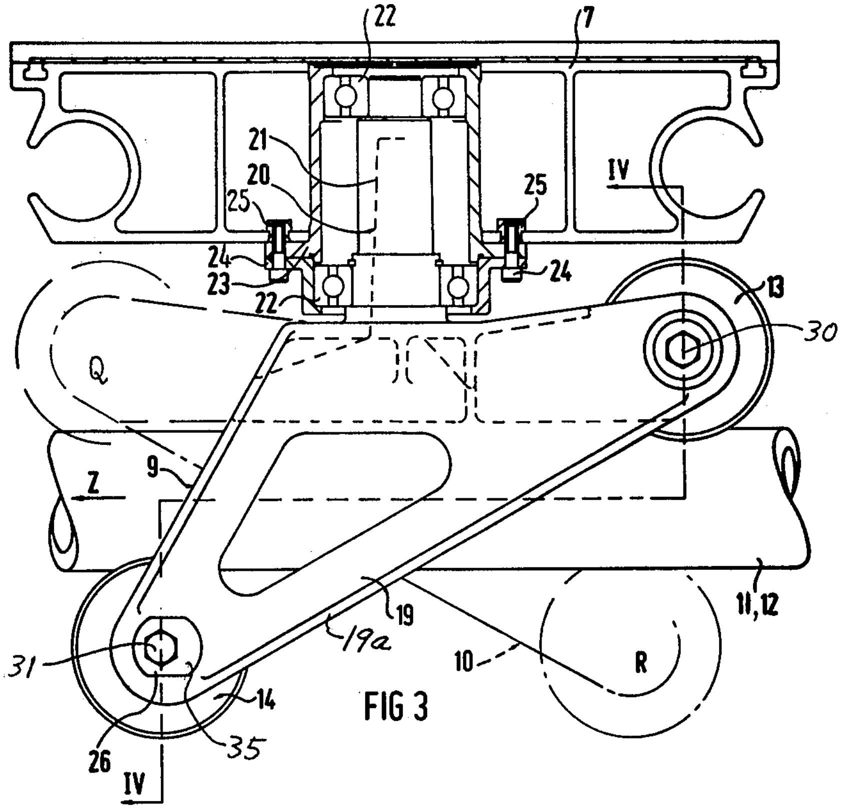
FIG. 3 is a part-sectional view of the end of a single platform.
Figure 4:
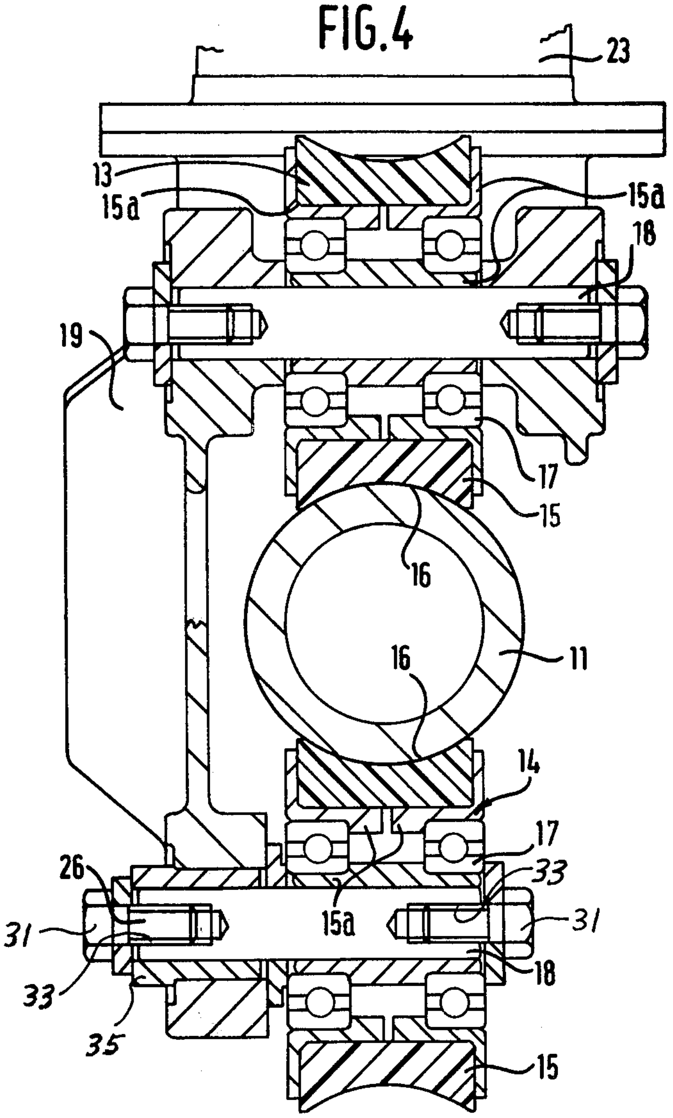
FIG. 4 is a cross-section on the line IV—IV of FIG. 3.
Figure 5:
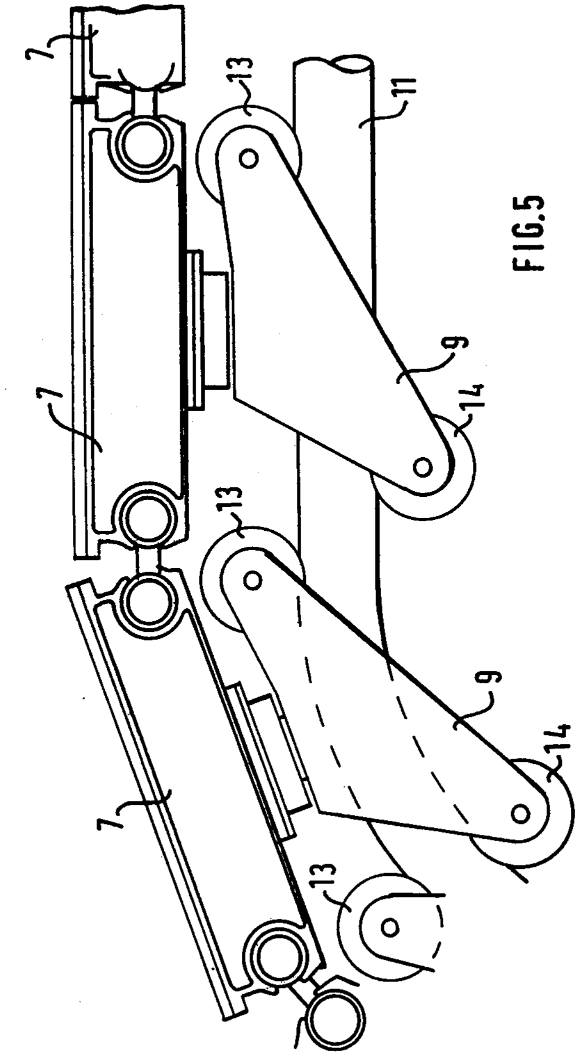
FIG. 5 shows diagrammatically four platforms at the beginning of the turnover part of the path indicated as V—V on FIG. 2.

Each wheel set comprises a main support wheel 13 which runs on the upper surface of the rail 11 and a secondary retaining wheel 14 running on the opposed underside of the rail 11 (FIGS. 3 and 5). As shown in FIG. 4 the wheels 13 and 14 each comprise assemblies including a nylon tire having a curved running surface 16 complementary to the shape of the rail 11. The tire is located by a split steel rim 15*a* on a central spindle 18 about a pair of ball bearings 17 located by the steel rim so that the wheel 14 may freely rotate upon the spindle 18.

As shown in FIGS. 3 and 4 the main support wheel 13 is attached to one corner of a generally triangular frame 19 to be axially rotatable about a similar spindle 18. The second retaining wheel assembly 14 is similarly attached to one other corner of the main frame. The two wheels 13 and 14 are screwed to the frame 19 by means of locking bolts 30 and 31 which respectively locate within threaded bores 32 and 33 provided in each end of each spindle 18. The locknuts are arranged to abut the frame to ensure firm location of the wheels while allowing axial rotation of the wheels about their spindles. The triangular frame 19 extends one side of the rail only and is provided with necessary stiffening webs 19*a* as may be seen in FIG. 3. Attachment means 20 are provided for fastening the wheel set to a platform 7. The attachment means 20 comprises a vertically extending support shaft 21 formed integrally with the frame 19 and arranged to carry a pair of spaced-apart ball bearings 22 which are engaged in a cylindrical housing 23 which comprises two parts which are bolted together to engage the ball bearings 22 and retain them upon the shaft 21. The cylinder metal housing 23 is attached to the platforms 7 by means of set screws 24 which engage trap-nuts 25 which are retained in the platform 7.

The spaced-apart bearings 22 provide a rigid attachment to the main frame 19, and hence the wheel set, to the end of the platform 7, the only movement allowed being rotation about the axis of the shaft 21. Accordingly the wheel sets 9 and 10 at either end of the platform are rigidly aligned as the platform 7 is of box construction giving it high torsional rigidity with regard to torsional stresses about the longitudinal axis of the elongated platform. Thus each torsionally rigid platform together with the carriages provides a stiff loader bearing support for passengers carried on the platform. The position of the second retaining wheel assembly is adjustable relative to main frame 19 by means of an eccentric bush 35 coaxially mounted on the spindle 18 (see FIGS. 3 and 4).

When the platform is mounted on its rails the eccentric bush 35 is rotated relative to the frame until the secondary retaining wheels 14 contact the rails on their undersides and the platforms 7 is substantially parallel to the rails 11, 12. Rotation of the eccentric bush tightens up the location of the assembly to remove rock and backlash. The bush can also be adjusted to take up wear in the bearing and in particular of the nylon tires. Similar adjustment may also be provided on the main support wheel.

The above location of the platforms on the rails allows if required, a single platform to be removed without incurring too many practical complications. The interconnecting means are removed and the locking bolt 30 of the second retaining wheel is removed, the eccentric bush is rotated to bring the wheel out of contact with the rail. The spindle 18 is withdrawn and the wheel removed, the other retaining wheel is also removed and the platform is subsequently lifted vertically from the rails.

The mounting on the rails is carried out such that one wheel set 13, 14 is arranged with the secondary retaining wheel in a leading configuration with regard to the direction of travel of the platform and the other wheel 13, 14 has its secondary retaining wheel in a trailing configuration. As shown in FIG. 3 the wheel set shown has a leading configuration with regard to platform movement in the direction Z and therefore the wheel set at the other end of the platform will be arranged with its wheels (shown chain-dotted) having axes in the position indicated by Q and R.

The resultant assembly supports the whole of the platform and any load carried thereon on two spaced-apart main support wheels 13 which are diagonally disposed with regard to the platform in plan. Tipping of the platform is prevented by means of the secondary retaining wheels 14 engaging the lower surfaces of the rails and, in the case of a platform conveyor of the type described in which adjacent platforms are conventionally interconnected, the interconnecting means may also contribute to prevent platforms from tipping. The wheel sets may pivot on the support shaft 21 beneath the ends of the platforms to allow accurate tracking and also to allow the required orientation changes of the platforms with regard to the guide rails as required for a variable speed conveyor of this type.

Furthermore the triangular arrangement of the wheel sets provides for convenient packing of one wheel set with regard to the next when the platforms are rotated about a horizontal axis as is required for the turnover at the beginning and the end of the load-bearing zones of the conveyor. This packing is shown in FIG. 5 where the secondary wheel sets 14 can be seen to move beneath the main wheel sets 13. This packing feature is of particular advantage as it is then not necessary to release the connections between the platforms as has been required in some previous designs of platform conveyors.

Platforms of this type are of lower rolling resistance then platforms having pairs of spaced-apart main support wheels to provide stability for each individual wheel set.

It will be appreciated that in the case of a platform conveyor in which no change of orientation of the platforms is required with regard to the guide rails, the pivot assembly 20 may be dispensed with and the wheel sets can in fact be connected rigidly to the platforms.

The above type of platform location could also be used in platform conveyors of the elevator type i.e. where each platform is on a different horizontal plane.

Having now described my invention what I claim is:

1. A platform for a platform conveyor having guide rail means for the platforms, the guide rail means being spaced apart transversely of the conveyor travel direction, said platform comprising a torsionally rigid substantially flat elongated plate having an upper conveying surface and a lower surface having means to engage said rail means, said engaging means comprising two wheel sets, each positioned to engage a rail means, each said wheel set having means to attach it to said lower surface, said attachment means restraining the wheel set against rotation about an axis lying parallel to the plane of the plate but permitting rotation about an axis perpendicular to the plane of the plate; each wheel set comprising a rigid frame having a single upper and a single lower wheel means for running on upper and lower surfaces of the rail means, the rotational axes of the upper and lower wheel means of each wheel set being spaced apart in the direction of normal movement of the platform with the upper wheel means of one wheel set being leading in the direction of movement and the upper wheel means of the other wheel set being trailing in the direction of movement, the torsional rigidity of the plate co-operating with the rigidity of the attachment means to restrain the plate against tilting movement.

2. The platform of claim 1 in which the rigid frame of each wheel set is substantially triangular shaped and has wheel means adjacent two corners of the frame.

3. The platform of claim 1 in which the wheel means define transversely curved rolling surfaces and the guide rail means are circular in cross section.

4. The platform of claim 1 in which the rolling surfaces of each wheel means is formed of resilient material.

5. The platform of claim 1 in which at least one wheel means is mounted in an eccentric bush rotatable to adjust the position of the wheel means relative to the frame.

6. The conveyor of claim 1 in which the wheel means of a wheel set are arranged to engage the same guide rail.

7. The platform of claim 1 in which the wheel sets are oriented to permit the wheel sets of successive platforms on the same guide rail means to lie in a partly overlapping configuration when at least two platforms are positioned side-by-side.

8. The platform of claim 1 in which the wheel means is only one wheel.

9. The platform of claim 1 in which each said wheel set has a separate attachment means to secure it to the platform.

10. The platform of claim 1 in which the wheel sets are disposed diagonally with regard to the platform as viewed in plan.

* * * * *